Patented July 28, 1931

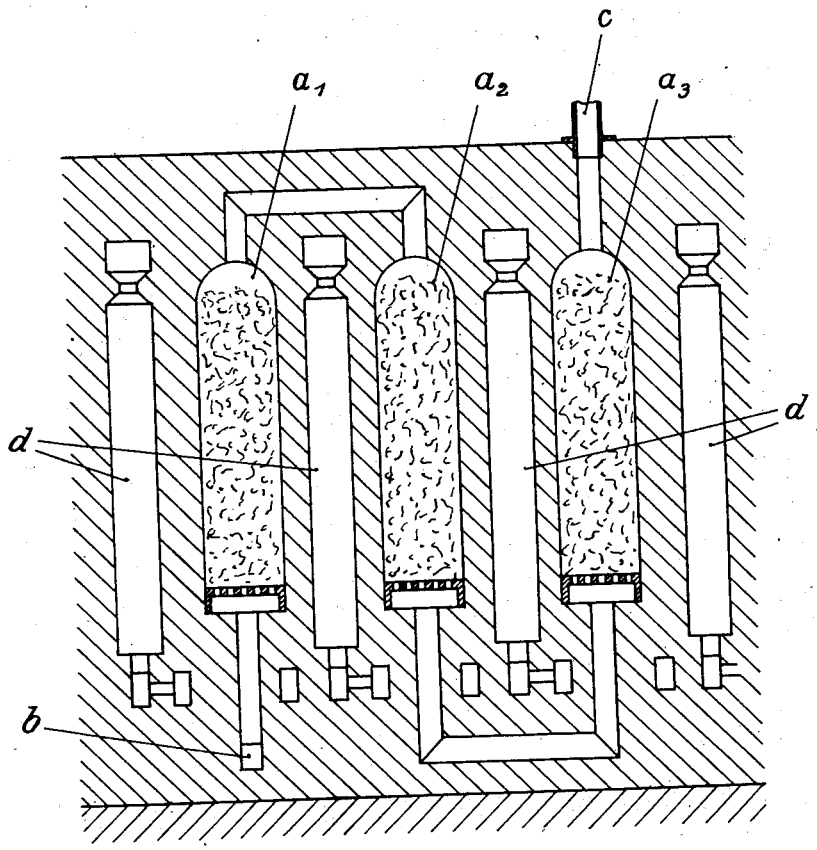

1,816,523

UNITED STATES PATENT OFFICE

WILHELM GLUUD, KONRAD KELLER, ROBERT SCHÖNFELDER, AND WALTER KLEMPT, OF DORTMUND-EVING, GERMANY, ASSIGNORS TO THE FIRM: BERGWERKSVERBAND ZUR VERWERTUNG VON SCHUTZRECHTEN DER KOHLENTECHNIK, GESELLSCHAFT MIT BESCHRÄNKTER HAFTUNG, OF DORTMUND-EVING, GERMANY

PRODUCTION OF HYDROGEN

Application filed July 20, 1927, Serial No. 207,211, and in Germany July 30, 1926.

Our invention refers to the production of hydrogen, more especially by reacting with carbon monoxide on steam in the presence of a catalyst. It is an object of our invention to improve this mode of producing hydrogen with a view to rendering the process simpler and more effective.

As is well known to those skilled in the art, if gases containing hydrogen and carbon monoxide are caused to react with steam in the presence of catalysts, the carbon monoxide will partly be converted into carbon dioxide according to the formula:

$$CO + H_2O = CO_2 + H_2.$$

As this reaction is a so-called equilibrium reaction a very considerable surplus of steam is required for completing the reaction.

In the process according to the present invention no surplus of steam is required, the carbon monoxide and steam being brought to react with each other in such manner that the carbon dioxide formed is removed at once from the reaction phase, the conversion being effected in the presence of substances which absorb carbon dioxide. By proceeding in this manner the equilibrium is altogether shifted towards the formation of hydrogen and carbon dioxide, so that the equivalent quantity of steam suffices to effect substantially complete reaction. The conditions of equilibrium for the formation of carbon dioxide will be the more favorable the lower the temperature of reaction. However with a drop of temperature the velocity of reaction will drop also, so that there is a lower limit of temperature at which the reaction can be carried through. (In the process according to the present invention a complete reaction will be obtained without taking too much regard to variations of temperature.) This is the more important as working at low temperature also necessitates the use of particularly strong and active catalysts which are known to be very sensitive against the influence of temperature. Our invention enables us to avoid also the use of these highly sensitive catalysts.

We can, for instance, employ specially prepared oxides or metals of the iron group, or compounds or minerals adapted to be converted into such oxides or metals during the process, provided that the substances are used in the presence of bodies capable of absorbing carbon dioxide. The operation can be carried through at a temperature which does not affect the substances capable of absorbing carbon dioxide.

In view of the circumstance that the substance absorbing the carbon dioxide will become ineffective in proportion to the increasing saturation, we prefer employing substances which can easily be regenerated by treating them with air or steam at elevated temperature, such as for instances oxides of the alkaline earth metals and more especially lime. It is however not necessary that the substance which is chosen to absorb carbon dioxide be used in pure state. We can as well use ores or minerals which are converted during the process into substances capable of absorbing carbon dioxide. Instead of employing lime we may, for instance, use marble, calc-spar, or the like, a suitable catalyst being admixed to the substance in question. We thus obtain an intermediate operation, during the first phase of which the catalytic reaction between the gases and the absorption of carbon dioxide will take place, while during the second phase and at higher temperature the carbon dioxide is split off again.

The heating up of the carbonates may be effected by burning gas and air right in the material. If working in this manner, the catalytically active substances and the substance absorbing carbon dioxide can be employed in lumps, but they can also be ground and intimately mixed or a chemical compound containing same can be used. If pulverulent materials are employed, we prefer briquetting same with or without agglutinant, in order to reduce the resistance offered to the gases. If these substances are used in their natural form, for instance as a ferruginous lime, or, if ferruginous minerals such as spathic iron ore, bauxite, or the like are mixed with lumps of lime, we obtain the further considerable advantage that the costly preparation is saved which is felt very heavily if large quantities of gases and consequently also large quantities of catalysts shall be employed. We have further found that we can employ dolomitic minerals with great advantage, inasmuch as the magnesium oxide is capable of influencing the conversion of carbon monoxide in a particularly favorable manner, while the lime contained therein at the same time acts towards absorbing the carbon dioxide which forms in the reaction. Magnesium oxide is particularly adapted for use as a catalyst in view of its great stability, remaining unaffected by an oxidizing as well as by a reducing atmosphere. This property is particularly valuable for the process according to our invention inasmuch as during this process an oxidizing atmosphere alternates with a reducing one, so that if a chemically non-resistive catalyst were used, it would be converted during the oxidization into an oxygen compound, the oxygen being combined during the reduction with hydrogen, which would thus be lost. These losses of hydrogen are obviated, if a chemically stable material is used, so that the catalytical properties of magnesium oxide are very valuable indeed in this process.

We can use the magnesia under many forms, either as pure magnesium oxide, as obtainable for instance by calcination of magnesite, or in mixture with other substances. The magnesium oxide may of course contain the other substances from the beginning, and we may use with particular advantage calcined dolomitic lime, because in this mineral the lime capable of absorbing carbon dioxide is present besides the catalytically active magnesia. We can also use substances in which magnesium oxide is formed during the process. We can use the magnesia and the substance absorbing carbon dioxide in lumps, but we can also use a pulverulent mixture thereof or a chemical compound containing same, and if desired the pulverulent mass can be briquetted with or without agglutinant in order to reduce the resistance offered to the gases passing therethrough. The manner of heating, whether direct or indirect, must be chosen according to the conditions prevailing in each individual case.

We can further replace, in a well known manner, part of the steam required in the reaction by air or oxygen. According to our invention the reaction can however also be carried through altogether with air or oxygen, owing to the continuous removal of the carbon dioxide formed from the gas phase, the small quantities of steam formed by reaction of hydrogen with oxygen sufficing for the catalytic conversion of carbon monoxide. For special purposes it may prove useful to proceed in the manner just described, more especially in case that the quantity of heat developed during the reaction with steam should not suffice to cover the losses of heat, so that an additional heating would be required. Also when producing a mixture of nitrogen and hydrogen it may prove advantageous to replace the steam by air, either entirely or partly, in order to introduce the required quantity of nitrogen into the mixture of gases. The process can be further improved by carrying it out in particularly suitable apparatus. We contemplate for instance carrying through the reaction in the chambers of a battery of coke ovens. In thus proceeding we obtain the considerable advantage that the gas can be acted upon in the immediate vicinity of the place where it is being produced, as we thus save the cost of a special apparatus, whereby the cost of production of the hydrogen obtained is still further reduced.

*Example 1*

100 cubic meters of a gas mixture containing besides hydrogen for instance 20 cubic meters of carbon monoxide, is conducted at atmospheric pressure together with the quantity of steam required by theory for the conversion of the carbon monoxide (i. e. 20 cubic meters) at a temperature between 300 and 600° C. over a mixture of 58 kgs. quick lime obtained by calcining lime stone in lumps of the size of a nut or fist with 15 kgs. bauxite. During the reaction all the carbon monoxide is converted into carbon dioxide, which is completely bound by the lime, the carbon monoxide being replaced in the gas mixture by an equal volume of hydrogen, so that the volume of the gas mixture is not altered. As soon as material quantities of carbon monoxide or carbon dioxide can be traced in the hydrogen produced, preferably however at a somewhat earlier stage, the raw gas containing carbon monoxide is conducted to an apparatus charged with quick lime and bauxite, in which the same process is carried through, while the lime in the first apparatus being saturated with carbon dioxide is regenerated by heating up to 900–1000° C.

*Example 2*

100 cubic meters of a gas mixture as described with reference to Example 1 are conducted under the same conditions over calcined dolomite obtained by the calcination of 195 kgs. raw dolomite comminuted to the size of walnuts or fists. An altogether pure hydrogen is obtained in this manner also. The dolomite saturated with carbon dioxide can be regenerated by heating over and over again, its catalytic action remaining the same throughout.

When operating with gas mixtures poor in carbon monoxide it may prove useful to carry through the catalytic reaction under increased pressure.

In the drawing affixed to this specification and forming part thereof an oven adapted for the carrying out of our new process is illustrated diagrammatically by way of example in a partial vertical section.

In the drawing the chambers $a^1$, $a^2$, $a^3$ are filled with the catalytically active substances and the substances capable of absorbing carbon dioxide. $b$ is a conduit for introducing the mixture of carbon monoxide and steam. The hydrogen obtained in the reaction escapes through the conduits $c$. Indirect heating of the chambers is effected by means of the heating flues $d$. We thereby obtain the advantage that the carbon dioxide obtained by regeneration of the absorbing material is recovered in pure condition. We may, however, also heat the chambers directly. Provision must however be made that the formation of hydrogen occurs at a lower temperature than the developing of carbon dioxide. By using steam or air or other gases for expelling the carbon dioxide, we are enabled to lower the temperature required for the decomposition of the absorbing material saturated with carbon dioxide.

Obviously the apparatus for carrying out our process can be adapted to various requirements, it being possible for instance to provide cooling means in order to restore the reaction temperature as quickly as possible after regeneration. Obviously in directly heated furnaces such as for instance shaft furnaces can be used instead of the oven shown and described.

Various changes may be made in the details disclosed in the foregoing specification without departing from the invention or sacrificing the advantages thereof.

We claim:—

1. In the production of hydrogen, a process which comprises passing gases containing carbon monoxid mixed with steam in volume substantially equal to that of the carbon monoxid over bodies of burnt lime containing magnesium oxid.

2. In the production of hydrogen, a process which comprises passing gases containing carbon monoxid mixed with steam in volume substantially equal to that of the carbon monoxid over bodies of burnt dolomitic lime.

3. In the production of hydrogen by reaction of steam with carbon monoxide, a process which comprises passing gases containing substantially equal volumes of steam and CO over shaped bodies containing CaO mixed with MgO.

4. In the production of hydrogen by reaction of steam with carbon monoxide in the presence of CaO, the improvement which comprises having a substantial quantity of MgO present with the said CaO, passing steam mixed with carbon monoxide over said CaO and MgO, and so proportioning the mixture that no substantial excess of steam over the stoichiometric proportions is present in said mixture.

In testimony whereof we affix our signatures.

WILHELM GLUUD.
KONRAD KELLER.
ROBERT SCHÖNFELDER.
WALTER KLEMPT.